(12) United States Patent
Sanada

(10) Patent No.: US 11,977,648 B2
(45) Date of Patent: May 7, 2024

(54) INFORMATION PROTECTION APPARATUS, INFORMATION PROTECTION METHOD AND PROGRAM

(71) Applicant: Nippon Telegraph and Telephone Corporation, Tokyo (JP)

(72) Inventor: Masaru Sanada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 268 days.

(21) Appl. No.: 17/612,081

(22) PCT Filed: Jun. 14, 2019

(86) PCT No.: PCT/JP2019/023747
§ 371 (c)(1),
(2) Date: Nov. 17, 2021

(87) PCT Pub. No.: WO2020/250444
PCT Pub. Date: Dec. 17, 2020

(65) Prior Publication Data
US 2022/0215105 A1   Jul. 7, 2022

(51) Int. Cl.
*G06F 21/62* (2013.01)
*G06F 21/55* (2013.01)
*G06V 30/14* (2022.01)

(52) U.S. Cl.
CPC .......... *G06F 21/62* (2013.01); *G06F 21/552* (2013.01); *G06V 30/1452* (2022.01); *G06F 2221/2141* (2013.01)

(58) Field of Classification Search
CPC ................. G06F 21/62; G06F 21/552; G06F 2221/2141; G06V 30/1452
See application file for complete search history.

(56) References Cited

U.S. PATENT DOCUMENTS

| | | | | |
|---|---|---|---|---|
| 8,544,060 | B1* | 9/2013 | Khetawat | H04L 63/20 726/1 |
| 8,826,452 | B1* | 9/2014 | He | G06F 21/84 726/27 |
| 2018/0096150 | A1* | 4/2018 | Viswanath | G06F 21/554 |
| 2019/0108355 | A1* | 4/2019 | Carson | G06F 21/6245 |

FOREIGN PATENT DOCUMENTS

| | | |
|---|---|---|
| JP | 2009116616 | 5/2009 |
| JP | 2013084235 | 5/2013 |
| JP | 2017130037 | 7/2017 |

* cited by examiner

*Primary Examiner* — Thaddeus J Plecha
(74) *Attorney, Agent, or Firm* — Fish & Richardson P.C.

(57) ABSTRACT

An information protection device includes a reception unit that receives an image of a screen displayed on a terminal connected to a certain network; an extraction unit that extracts input information for the screen from the image; a determination unit that determines whether or not the input information matches predetermined information; and a control unit that performs, when the input information is determined to be matched with the predetermined information, a control for preventing the input information from being transmitted from the network.

3 Claims, 6 Drawing Sheets

INFORMATION PROTECTION APPARATUS, INFORMATION PROTECTION METHOD AND PROGRAM

CROSS-REFERENCE TO RELATED APPLICATIONS

This application is a National Stage application under 35 U.S.C. § 371 of International Application No. PCT/JP2019/023747, having an International Filing Date of Jun. 14, 2019. The disclosure of the prior application is considered part of the disclosure of this application, and is incorporated in its entirety into this application.

TECHNICAL FIELD

The present invention relates to an information protection device, an information protection method, and a program.

BACKGROUND ART

Conventionally, the communication content between a PC or the like in a company and a server outside the company is monitored, blocked, or the like by a firewall, an IDS (Intrusion Detection System), an IPS (Intrusion Prevention System), a WAF (Web Application Firewall), or the like.

CITATION LIST

Patent Literature

[PTL 1] Japanese Patent Application Publication No. 2017-130037

SUMMARY OF THE INVENTION

Technical Problem

However, since the IDS and the IPS each monitor packets one by one and the WAF monitors an HTTP protocol message, it is not possible to grasp what kind of information is transmitted outside the company. Therefore, with these technologies, it is difficult to monitor and prevent the transmission of information required to be protected within the company to the outside.

The present invention has been made in view of the foregoing, and an object of the present invention is to reduce the possibility that information required to be protected will be leaked to the outside.

Means for Solving the Problem

Therefore, in order to solve the above problem, an information protection device includes a reception unit that receives an image of a screen displayed on a terminal connected to a certain network; an extraction unit that extracts input information for the screen from the image; a determination unit that determines whether or not the input information matches predetermined information; and a control unit that performs, when the input information is determined to be matched with the predetermined information, a control for preventing the input information from being transmitted from the network.

Effects of the Invention

It is possible to reduce the possibility that information required to be protected will be leaked to the outside.

DESCRIPTION OF EMBODIMENTS

Figure 1:
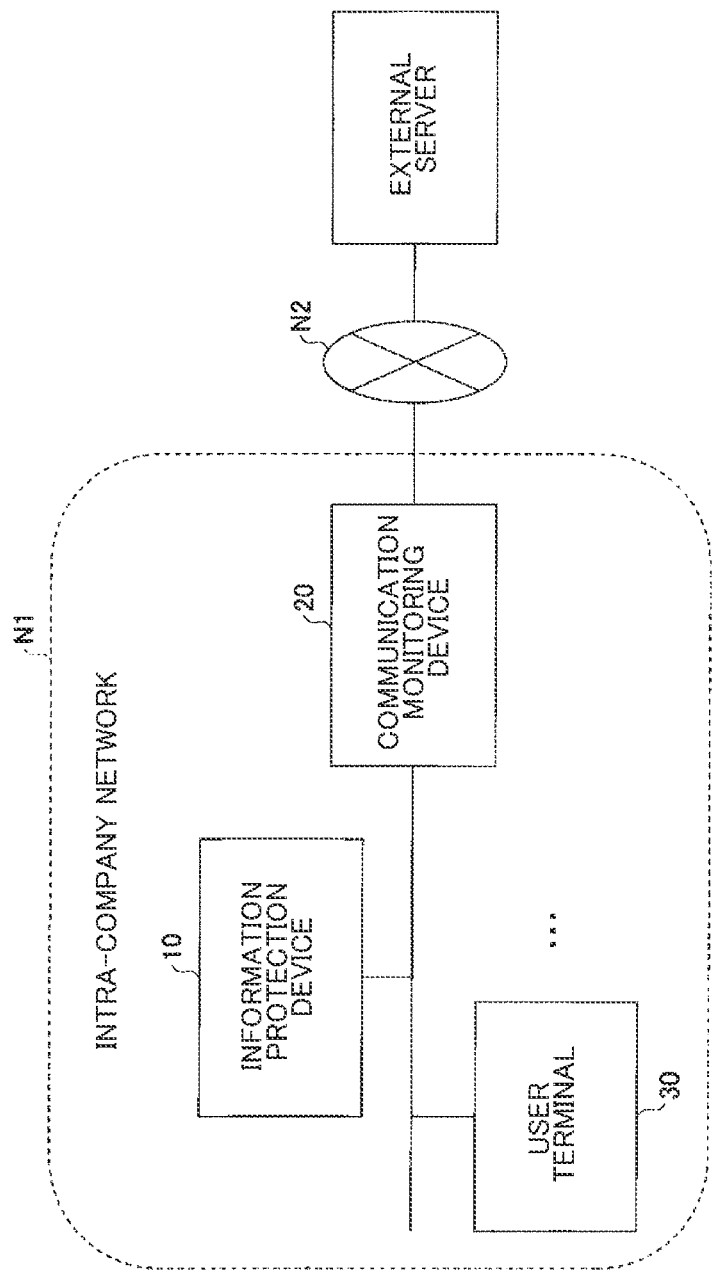
FIG. 1 is a diagram illustrating a configuration example of an information protection system according to an embodiment of the present invention.

Hereinafter, embodiments of the present invention will be described with reference to the drawings. FIG. 1 is a diagram illustrating a configuration example of an information protection system according to an embodiment of the present invention. In FIG. 1, an intra-company network N1 is a network (e.g., LAN (Local Area Network) or an intranet, etc.) in a certain company (hereinafter, referred to as "company A"). One or more user terminals 30, an information protection device 10, and a communication monitoring device 20 are connected by a network which constitutes the intra-company network N1. Specifically, each user terminal 30, the information protection device 10, and the communication monitoring device 20 are installed in a region of company A.

The user terminal 30 is a terminal such as a PC (Personal Computer) used by an employee or the like of company A. For example, the user terminal 30 may be assigned to each employee.

The communication monitoring device 20 includes one or more computers that connect the intra-company network N1 to an external network N2 such as the Internet. All communications between the intra-company network N1 and the external network N2 pass through (are relayed by) the communication monitoring device 20. For example, a proxy server or the like may be used as the communication monitoring device 20. Further, the communication monitoring device 20 may function as a firewall. In the present embodiment, the communication monitoring device 20 monitors the communication from the user terminal 30 to an external server connected to the external network N2, and prevents information that is undesirable for it to be transmitted to the outside (required to be protected from leakage to the outside) (hereinafter, referred to as the "protected information") from being transmitted.

The information protection device 10 includes one or more computers that analyze, in response to an input of information into a Web page displayed on the user terminal 30, whether or not the input information corresponds to the protected information. When the information protection device 10 determines that the input information corresponds to the protected information, the information protection device 10 instructs the communication monitoring device 20 to take an action (e.g., to prevent the input information from being transmitted to the outside) for the communication (transmission) of the input information.

Figure 2:
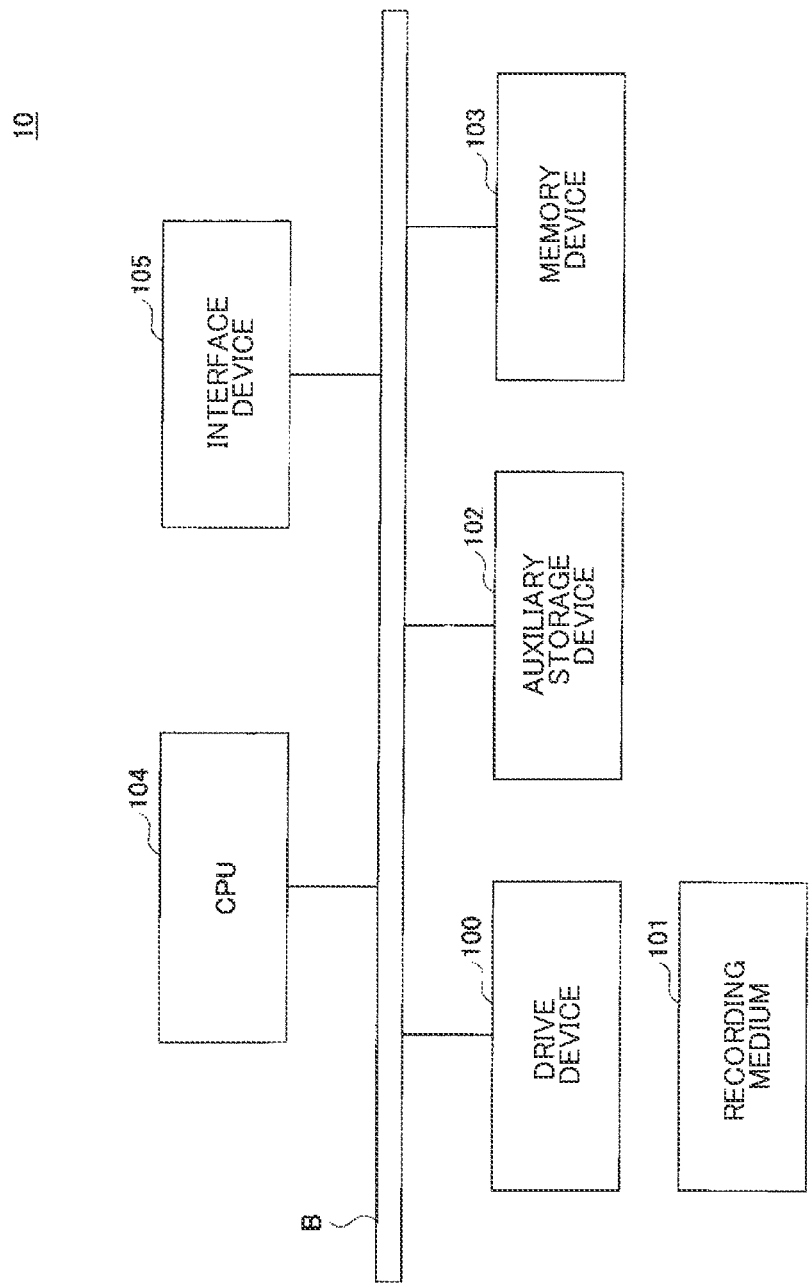
FIG. 2 is a diagram illustrating a hardware configuration example of an information protection device 10 according to the embodiment of the present invention.

FIG. 2 is a diagram illustrating a hardware configuration example of the information protection device 10 according to the embodiment of the present invention. The information protection device 10 in FIG. 2 includes a drive device 100, an auxiliary storage device 102, a memory device 103, a CPU 104, an interface device 105, and the like, which are connected to each other by a bus B.

A program that executes processing in the information protection device 10 is provided by a recording medium 101 such as a CD-ROM. When the recording medium 101 storing the program is loaded into the drive device 100, the program is installed in the auxiliary storage device 102 from the recording medium 101 via the drive device 100. However, the program does not necessarily have to be installed from the recording medium 101, and may be downloaded from another computer via the network. The auxiliary storage device 102 stores the installed program and also stores necessary files, data, and the like.

The memory device 103 reads and stores the program from the auxiliary storage device 102 in response to an instruction to start the program. The CPU 104 implements functions related to the information protection device 10 according to the program stored in the memory device 103. The interface device 105 is used as an interface for connecting to the network.

Figure 3:
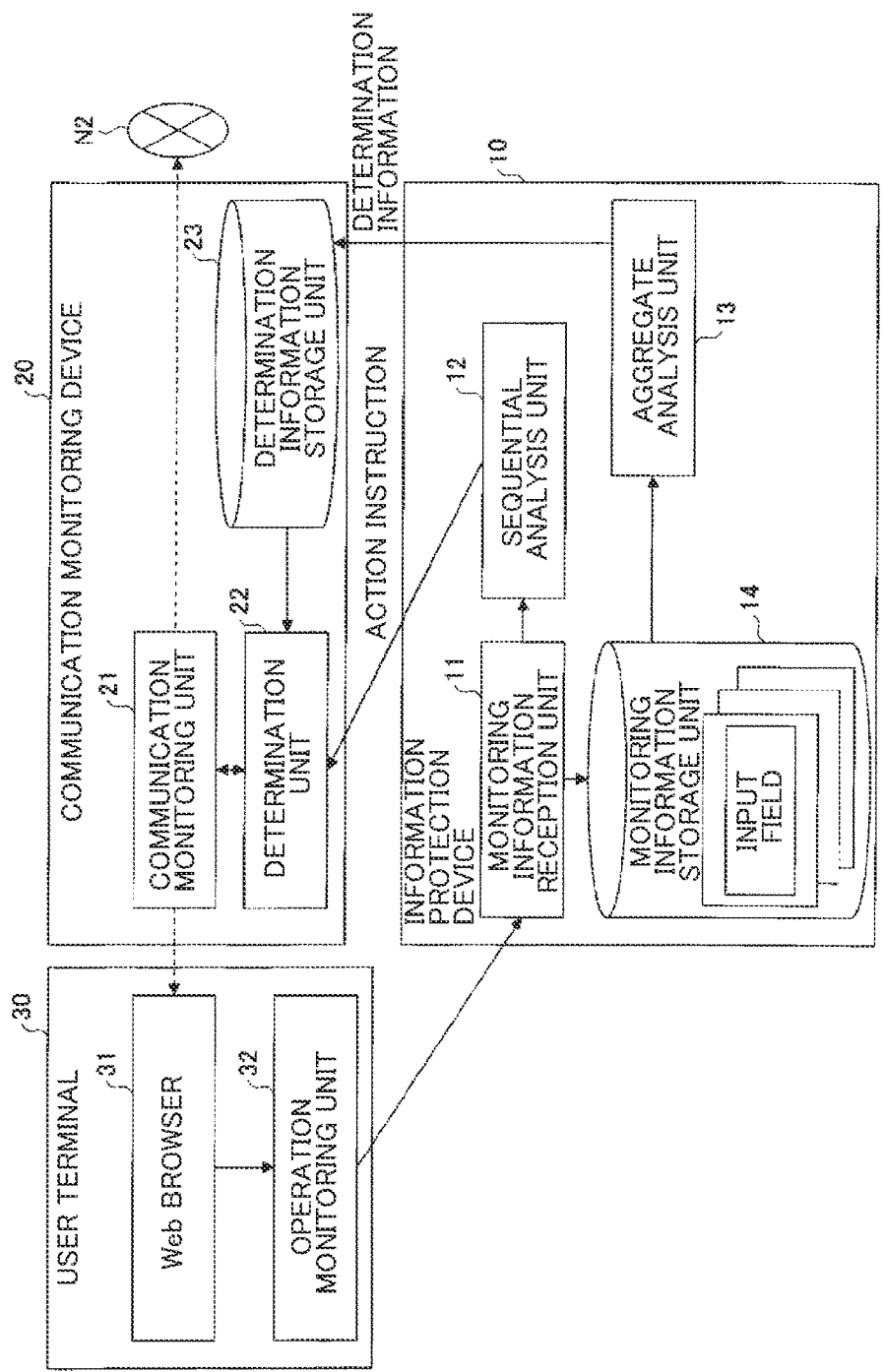
FIG. 3 is a diagram illustrating a functional configuration example of the information protection system according to the embodiment of the present invention.

FIG. 3 is a diagram illustrating a functional configuration example of the information protection system according to the embodiment of the present invention. In FIG. 3, the user terminal 30 includes a Web browser 31 and an operation monitoring unit 32. The Web browser 31 is a general Web browser, and accesses the external server connected to the external network N2 to acquire a Web page. The Web browser 31 displays the acquired Web page. The operation monitoring unit 32 is implemented by processing of causing a CPU of the user terminal 30 to execute one or more programs installed in the user terminal 30.

The operation monitoring unit 32 monitors operations (input of information such as a character string) by the user on the Web page displayed by the Web browser 31. When the operation monitoring unit 32 detects a predetermined operation by which information is estimated to be likely input, the operation monitoring unit 32 acquires a captured image (hereinafter, referred to as the "screen image") of a Web page at the timing of detecting the operation and also transmits the information including the URL of the Web page and the IP address of the user terminal 30 (hereinafter referred to as the "monitoring information") to the information protection device 10. For example, the fact that a specific key is pressed may be detected as an information input operation. Examples of the specific key include a return key, "control+V keys", or the like.

The information protection device 10 includes a monitoring information reception unit 11, a sequential analysis unit 12, and an aggregate analysis unit 13. Each of these units is implemented by processing of causing the CPU 104 to execute one or more programs installed in the information protection device 10. The information protection device 10 also uses a monitoring information storage unit 14. The monitoring information storage unit 14 can be implemented using, for example, the auxiliary storage device 102, a storage device connectable to the information protection device 10 via the network, or the like.

The monitoring information reception unit 11 receives monitoring information transmitted from the operation monitoring unit 32. The monitoring information reception unit 11 stores the received monitoring information in the monitoring information storage unit 14 and notifies the sequential analysis unit 12 of the received monitoring information.

The sequential analysis unit 12 extracts the information input on the Web page (input information) from the screen image included in the monitoring information notified from the monitoring information reception unit 11, and determines whether or not the input information corresponds to protected information. As it is clear from the above, the monitoring information is notified by the monitoring information reception unit 11 each time an input is performed by the user. Accordingly, the sequential analysis unit 12 sequentially determines whether or not the input information corresponds to the protected information in response to the input by the user. When the sequential analysis unit 12 determines that the input information corresponds to the protected information, the sequential analysis unit 12 performs a control for preventing the input information from being transmitted from the intra-company network N1. Specifically, the sequential analysis unit 12 transmits the input information and an instruction to take an action (e.g., to prevent the input information from being transmitted, etc.) on communication (transmission) for the input information (hereinafter, such an instruction is referred to as the "action instruction") to the communication monitoring device 20.

The aggregate analysis unit 13 analyzes, at a timing asynchronous with the timing of input to the Web page such as regular timing, the monitoring information stored (accumulated) in the monitoring information storage unit 14 before that timing, and thus identifies a predetermined access (hereinafter referred to as the "improper access") that is likely to have a security problem based on the past external accesses. The analysis unit transmits (notifies) information for identifying the improper access as determination information to the communication monitoring device 20.

The communication monitoring device 20 includes a communication monitoring unit 21 and a determination unit 22. Each of these units is implemented by processing of causing a CPU of the communication monitoring device 20 to execute one or more programs installed in the communication monitoring device 20. The communication monitoring device 20 also uses a determination information storage unit 23. The determination information storage unit 23 can be implemented using, for example, the auxiliary storage device 102, a storage device connectable to the communication monitoring device 20 via the network, or the like.

The communication monitoring unit 21 monitors the communication between the intra-company network N1 and the external network N2, and inquires of the determination unit 22 as to whether or not the communication is permitted (whether or not it is to be prevented). The communication monitoring unit 21 blocks communication to be prevented indicated in an instruction from the determination unit 22.

The determination unit 22 determines whether or not the communication is permitted (whether or not it is to be prevented) based on the input information notified by the sequential analysis unit 12, and/or the determination information stored in the determination information storage unit 23. For example, when the information to be transmitted to the outside by the communication matches the input information, the determination unit 22 determines that the communication is to be prevented. Note that the determination information refers to information registered in advance as information indicative of communication to be prevented. For example, the determination information may be registered based on publicly available threat information. In addition, the input information corresponding to the protected information as notified by the sequential analysis unit 12 or the aggregate analysis unit 13 is also registered as the determination information. Thus, the information determined to be the protected information by the sequential analysis unit 12 or the aggregate analysis unit 13 at least once is prevented from being transmitted to the outside by the determination unit 22.

Figure 4:
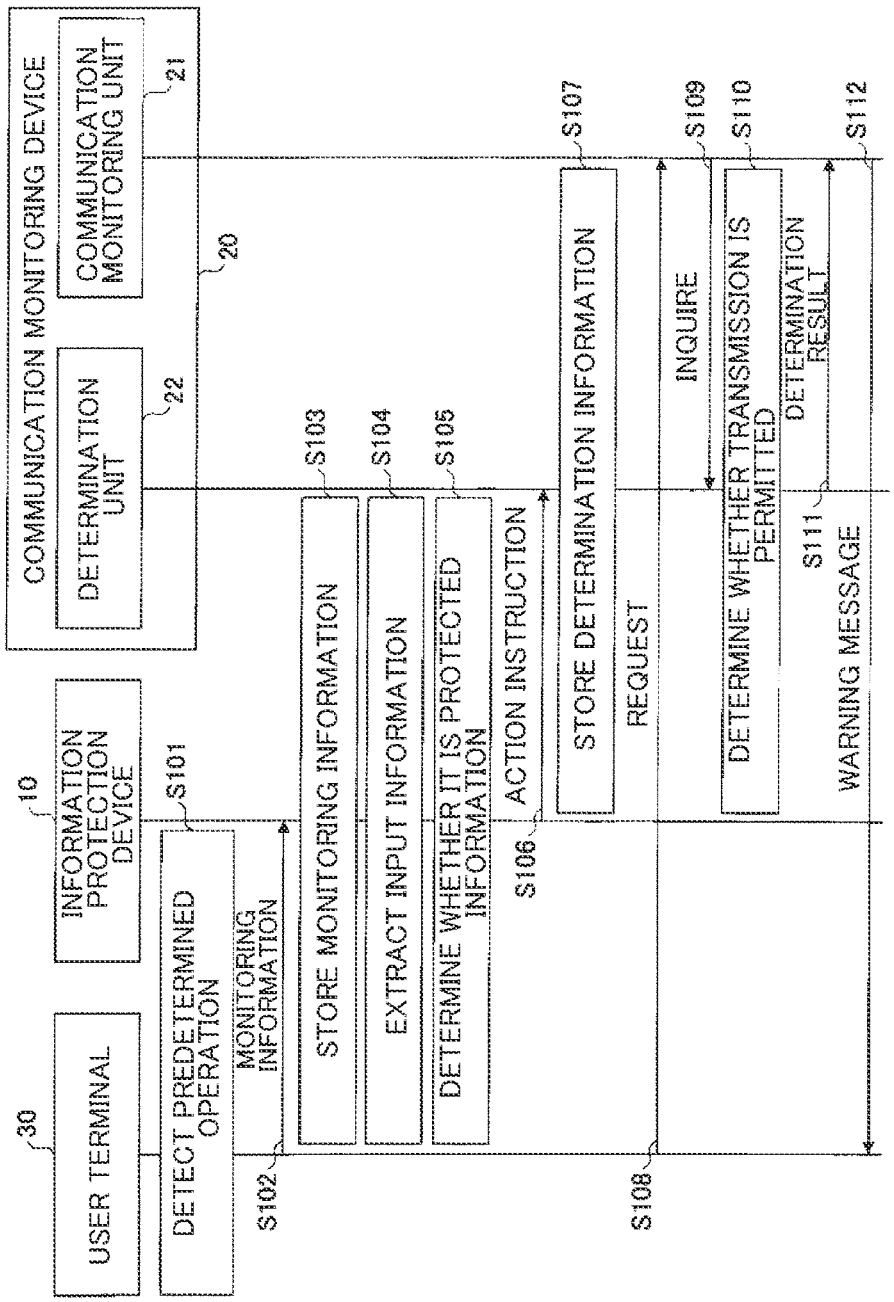
FIG. 4 is a sequence diagram illustrating an example of a processing procedure of sequential processing for input information.

A processing procedure executed in the information protection system will be described below. FIG. 4 is a sequence diagram illustrating an example of the processing procedure of sequential processing for input information. In the initial state of FIG. 4, it is assumed that a Web page (hereinafter, referred to as the "target page") acquired from an external server is being displayed on the Web browser 31 of the user terminal 30.

When the operation monitoring unit 32 of the user terminal 30 detects that a predetermined operation has been performed on the Web page by the user (S101), the operation monitoring unit 32 transmits the monitoring information related to the operation to the information protection device 10 (S102). The monitoring information includes a captured image (screen image) of the Web page acquired by the operation monitoring unit 32 in response to the detection of the operation, the URL of the Web page, the IP address of the user terminal 30, and the like.

When the monitoring information reception unit 11 of the information protection device 10 receives the monitoring information, the monitoring information reception unit 11 stores the monitoring information in the monitoring information storage unit 14 (S103), and also notifies the sequential analysis unit 12 of the monitoring information.

Subsequently, the sequential analysis unit 12 identifies the region of the input field in the screen image included in the monitoring information (hereinafter, referred to as the "target monitoring information") notified by the monitoring information reception unit 11, and sets that region to be subjected to character recognition (OCR (Optical Character Recognition)) to extract the input information (input character string) from the screen image (S104). Note that the region of the input field may be identified by using a known technique. Further, the sequential analysis unit 12 may associate the extracted input information with the monitoring information stored in step S103 and store the input information in the monitoring information storage unit 14.

Subsequently, the sequential analysis unit 12 determines whether or not the extracted input information (hereinafter, referred to as the "target input information") corresponds to the protected information (S105). Examples of the information corresponding to the protected information include personal information of an employee of company A (name, affiliated organization information, telephone number of affiliated organization, e-mail address in company A, various IDs/passwords in company A, and other information related to company A) and user's private personal information (name, home address, personal contact information, various SNS accounts, etc.). In place of or in addition to the personal information, information required to be protected for company A may be set as the protected information. For example, confidential information or company-only information may be set as the protected information.

When the above information is used as the protected information, a list of character strings indicative of that information may be registered in advance in the auxiliary storage device 102 as the protected information. Further, if a plurality of character strings registered in this way have a common part, a set of the plurality of character strings may be registered by one character string using a regular expression.

In this case, the sequential analysis unit 12 determines whether or not the target input information corresponds to the protected information depending on whether or not the target input information matches any character string stored as protected information in the auxiliary storage device 102.

Further, the sequential analysis unit 12 may extract a message (message indicative of an input request) for the input field of the target input information by character recognition for the screen image, and if the content (request content) of the message does not match the target input information, and the sequential analysis unit 12 may determine that the target input information corresponds to the protected information.

If the sequential analysis unit 12 determines that the target input information does not correspond to the protected information, the sequential analysis unit 12 does not execute the subsequent processing. On the other hand, when the sequential analysis unit 12 determines that the target input information corresponds to the protected information, the sequential analysis unit 12 transmits an action instruction indicating that the transmission of the target input information is stopped to the communication monitoring device 20 (S106). That action instruction includes the target input information.

When the determination unit 22 of the communication monitoring device 20 receives the action instruction, the determination unit 22 stores the target input information included in the action instruction in the determination information storage unit 23 as determination information (S107). Note that when the determination information that matches the target input information is already stored in the determination information storage unit 23, step S107 may be skipped.

After that, when an operation for confirming the input (e.g., pressing an OK button) is performed on the target page displayed on the Web browser 31 of the user terminal 30, the Web browser 31 transmits a request including the input information input to the target page to the external server (S108). When the communication monitoring unit 21 of the communication monitoring device 20 detects (receives) the request, the communication monitoring unit 21 inquires of the determination unit 22 as to whether or not to transmit the request (S109).

The determination unit 22 determines whether or not the request is to be transmitted by collating the content of the request with the determination information (S110). Specifically, if the request includes a character string that matches the determination information, the determination unit 22 determines that the request is not to be transmitted, and otherwise, the determination unit 22 determines that the request is to be transmitted. Here, if the sequential analysis unit 12 determines that the target input information is the protected information, the target input information has already been stored in the determination information storage unit 23 as determination information. Therefore, if the target input information is the protected information, it is determined that the transmission is not permitted.

Subsequently, the determination unit 22 responds to the communication monitoring unit 21 with the determination result ("transmission permitted" or "transmission not permitted") (S111). If the determination result indicates "transmission permitted", the communication monitoring unit 21 transmits the request to the destination. On the other hand, if the determination result indicates "transmission not permitted", the request is prevented from being transmitted. For example, the request may be discarded. Further, the communication monitoring unit 21 may transmit a response including a warning message indicating that the request includes the protected information to the Web browser 31 of the user terminal 30 (S112). In this case, the Web browser 31 will display the warning message. As a result, the user can know that the information input by the user includes the protected information, and can redo the input operation.

Note that if there are a plurality of input fields for one Web page, step S101 and subsequent steps are sequentially executed every time information (character string) is input to each input field.

Figure 5:
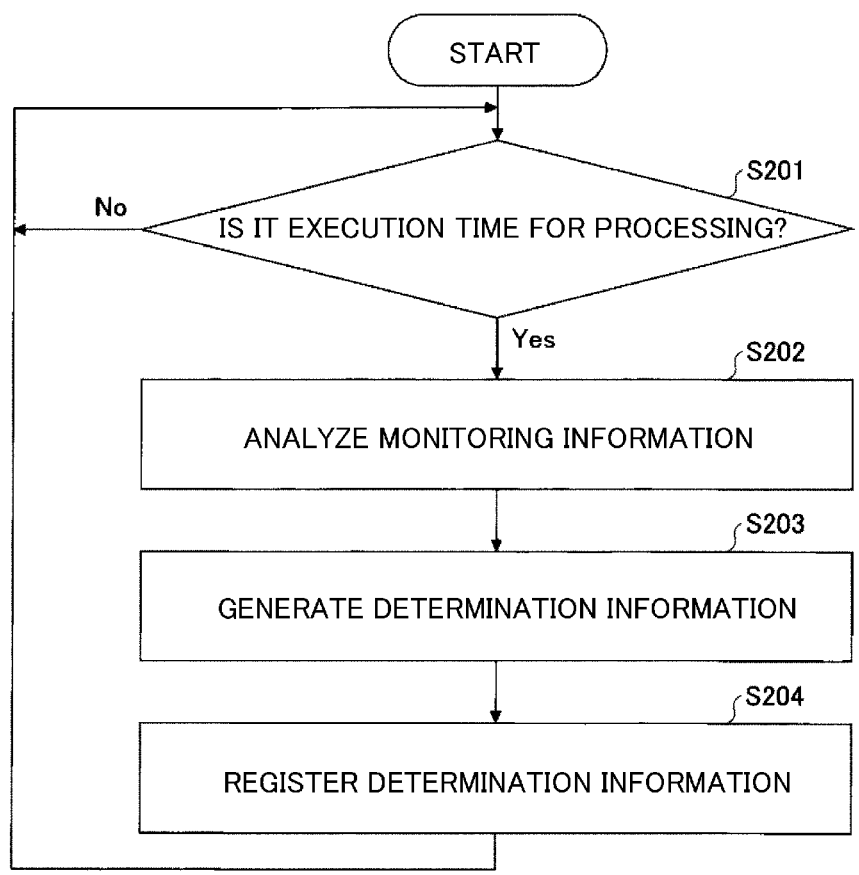
FIG. 5 is a flowchart illustrating an example of a processing procedure executed by an aggregate analysis unit 13.

Next, a processing procedure executed by the aggregate analysis unit 13 will be described. FIG. 5 is a flowchart illustrating an example of the processing procedure executed by the aggregate analysis unit 13.

The aggregate analysis unit 13 waits for the arrival of the execution time after step S202 (S201). For example, if step S202 and subsequent steps are executed at certain time intervals, the aggregate analysis unit 13 waits for the elapse of the time interval. When the time interval elapses (Yes in S201), improper access is identified from among the past external accesses by analyzing the past monitoring information stored in the monitoring information storage unit 14 (S202). Here, the monitoring information to be analyzed may be all monitor information stored in the monitoring information storage unit 14, or may be monitoring information stored in the monitoring information storage unit 14 during the time interval.

Figure 6:
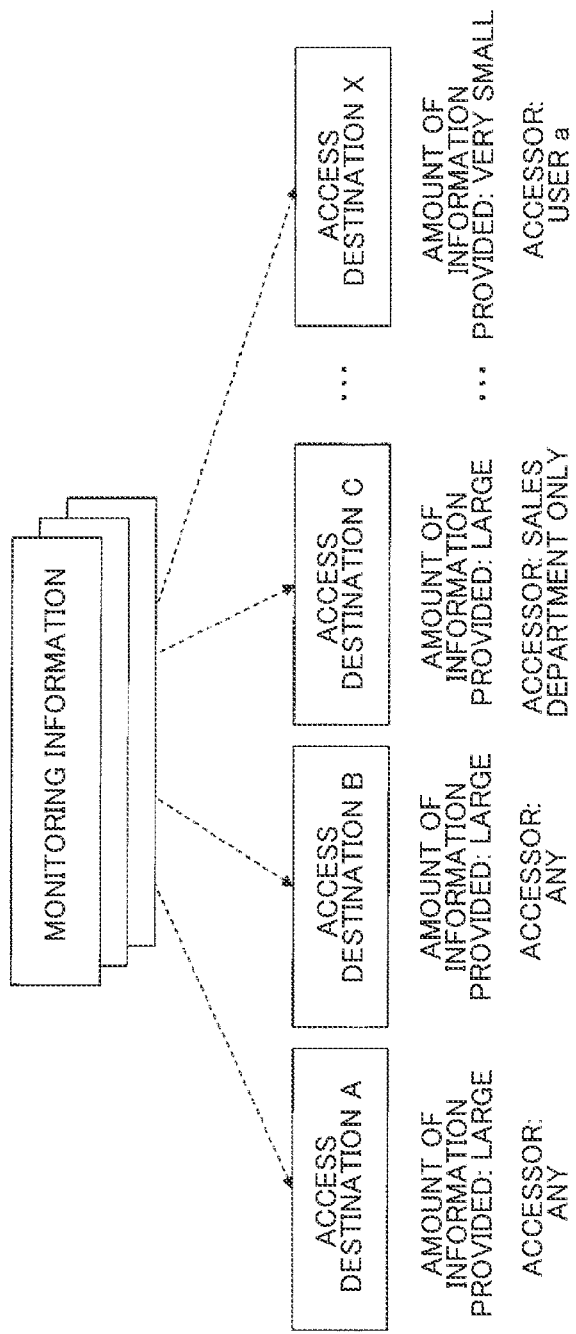
FIG. 6 is a diagram illustrating an analysis of pieces of past monitoring information performed by the aggregate analysis unit 13.

FIG. 6 is a diagram illustrating an analysis of pieces of past monitoring information performed by the aggregate analysis unit 13. FIG. 6 also illustrates an example in which the pieces of monitoring information are analyzed with the amount of information provided and the accessor for each access destination.

The access destination can be distinguished based on the URL (URL of the Web page) included in the monitoring information. Further, the amount of information provided is a size of the input information for the access destination (e.g., bytes). Accordingly, the number of accesses and the amount of information provided for each access can differ depending on the content of a service provided by each access destination. For an access destination that needs to be accessed every day in in-house work, even when the amount of information provided for one access is small, the accumulated amount of information provided is large. Note that the amount of information provided can be measured based on the input information stored in association with the monitoring information.

The accessor can be identified based on the IP address (IP address of the user terminal 30) included in the monitoring information.

For example, the aggregate analysis unit 13 may determine, to be improper access, an access in which the amount of information provided is extremely small as compared with the other access destinations and the corresponding accessor is limited to a specific access source. In this case, in the example of FIG. 6, the access to access destination X is identified as an improper access.

Further, the aggregate analysis unit 13 may analyze the screen image included in each piece of monitoring information to identify an improper access. For example, the aggregate analysis unit 13 identifies a screen transition for each URL based on the URL and the screen image included in each piece of monitoring information. In this case, the aggregate analysis unit 13 may identify, as an improper access, from among accesses to a certain URL, an access in which a set of screen images indicating a screen transition different from the screen transition identified for that URL is stored in the monitoring information storage unit 14. This is because such an access may cause leading to a dangerous site and leak of protected information.

Subsequently, the aggregate analysis unit 13 generates information for identifying the access determined to be improper access as determination information (S203). For example, information including the URL of the access destination of the access may be used as the determination information. Subsequently, the aggregate analysis unit 13 registers the determination information in the determination information storage unit 23 of the communication monitoring device 20 (S204).

As a result, in the subsequent, the determination information is available in the determination unit 22. When the determination information is a URL, the determination unit 22 determines that the request addressed to the URL is not permitted to be transmitted.

As described above, according to the present embodiment, it is possible to reduce the possibility that information required to be protected will be leaked to the outside from a certain network such as the intra-company network N1. In addition, having the accumulated screen images makes it possible to grasp a series of service flows and thus analyze the validity of the input information before and after the screen.

Note that in the present embodiment, the monitoring information reception unit 11 is an example of a reception unit. The sequential analysis unit 12 is an example of an extraction unit, a determination unit, and a control unit. The monitoring information storage unit 14 is an example of a storage unit. The aggregate analysis unit 13 is an example of an identification unit.

Although the embodiment of the present invention has been described in detail above, the present invention is not limited to such specific embodiment, and various modifications and changes are possible within the scope and spirit of the present invention defined in the claims.

REFERENCE SIGNS LIST

10 Information protection device
11 Monitoring information reception unit
12 Sequential analysis unit
13 Aggregate analysis unit
14 Monitoring information storage unit
20 Communication monitoring device
21 Communication monitoring unit
22 Determination unit
23 Determination information storage unit
30 User terminal
31 Web browser
32 Operation monitoring unit
100 Drive device
101 Recoding medium
102 Auxiliary storage device 103 Memory device
104 CPU
105 Interface device
B Bus
N1 Intra-company network
N2 External network

The invention claimed is:

1. An information protection device comprising one or more hardware processors, configured to perform operations comprising:
    receiving monitoring information including (i) an image of a screen of a web page displayed on a terminal connected to a network, (ii) a uniform resource locator (URL) of the web page, and (iii) an Internet protocol (IP) address of the terminal, wherein the terminal communicates with an external server;
    extracting input information from the image of the screen;
    determining whether or not the input information matches predetermined protected information;
    performing, when the input information is determined to be matched with the predetermined protected information, a control for preventing the input information from being transmitted from the network to the external server;
    storing, into a storage medium, aggregated monitoring information of a plurality of terminals including images of web pages, URLs of the web pages, and IP addresses from the plurality of terminals;
    analyzing the aggregated monitoring information of the plurality of terminal and identifying an improper access to a particular URL from a particular terminal; and
    preventing the improper access to the particular URL from the particular terminal.

2. An information protection method performed by a computer, the information protection method comprising:
    receiving monitoring information including (i) an image of a screen of a web page displayed on a terminal connected to a network, (ii) a uniform resource locator (URL) of the web page, and (iii) an Internet protocol (IP) address of the terminal, wherein the terminal communicates with an external server;
    extracting input information from the image of the screen;
    determining whether or not the input information matches predetermined protected information;
    performing, when the input information is determined to be matched with the predetermined protected information, a control for preventing the input information from being transmitted from the network to the external server;
    storing, into a storage medium, aggregated monitoring information of a plurality of terminals including images of web pages, URLs of the web pages, and IP addresses from the plurality of terminals;
    analyzing the aggregated monitoring information of the plurality of terminal and identifying an improper access to a particular URL from a particular terminal; and
    preventing the improper access to the particular URL from the particular terminal.

3. A non-transitory computer readable medium storing one or more instructions causing a computer to perform:
    receiving monitoring information including (i) an image of a screen of a web page displayed on a terminal connected to a network, (ii) a uniform resource locator (URL) of the web page, and (iii) an Internet protocol (IP) address of the terminal, wherein the terminal communicates with an external server;
    extracting input information from the image of the screen;
    determining whether or not the input information matches predetermined protected information;
    performing, when the input information is determined to be matched with the predetermined protected information, a control for preventing the input information from being transmitted from the network to the external server;
    storing, into a storage medium, aggregated monitoring information of a plurality of terminals including images of web pages, URLs of the web pages, and IP addresses from the plurality of terminals;
    analyzing the aggregated monitoring information of the plurality of terminal and identifying an improper access to a particular URL from a particular terminal; and
    preventing the improper access to the particular URL from the particular terminal.

* * * * *